United States Patent
Ramalho de Oliveira et al.

(10) Patent No.: US 11,882,507 B2
(45) Date of Patent: Jan. 23, 2024

(54) METHODS AND SYSTEMS FOR IN-VEHICLE DATA-DRIVEN CONNECTIVITY OPTIMIZATION IN A NETWORK OF MOVING THINGS

(71) Applicant: Veniam, Inc., Mountain View, CA (US)

(72) Inventors: Patricia Cristina Ramalho de Oliveira, S.Félix da Marinha (PT); Daniel Cardoso de Moura, Gulpilhares (PT)

(73) Assignee: VENIAM, INC., Mountain View, CA (US)

(*) Notice: Subject to any disclaimer, the term of this patent is extended or adjusted under 35 U.S.C. 154(b) by 0 days.

(21) Appl. No.: 17/143,426

(22) Filed: Jan. 7, 2021

(65) Prior Publication Data

US 2021/0211852 A1    Jul. 8, 2021

Related U.S. Application Data

(60) Provisional application No. 62/958,591, filed on Jan. 8, 2020.

(51) Int. Cl.
| | |
|---|---|
| *H04W 4/46* | (2018.01) |
| *H04W 28/08* | (2023.01) |
| *H04W 84/18* | (2009.01) |

(52) U.S. Cl.
CPC ......... *H04W 4/46* (2018.02); *H04W 28/0883* (2020.05); *H04W 28/09* (2020.05); *H04W 84/18* (2013.01)

(58) Field of Classification Search
CPC ........... H04W 4/40; H04W 4/42; H04W 4/44; H04W 4/46; H04W 4/48; H04W 28/0883; H04W 28/09; H04W 84/18; H04W 84/02; H04W 48/17; H04W 48/18; H04W 48/20; H04W 40/246
See application file for complete search history.

(56) References Cited

U.S. PATENT DOCUMENTS

| | | | |
|---|---|---|---|
| 9,565,625 B1* | 2/2017 | MacNeille | ............ H04W 48/18 |
| 2016/0334237 A1 | 11/2016 | Wang | |
| 2017/0160742 A1 | 6/2017 | Ross et al. | |
| 2017/0164257 A1 | 6/2017 | Ross et al. | |

(Continued)

OTHER PUBLICATIONS

International Search Report and Written Opinion for PCT/US2021/012633, dated Apr. 6, 2021, 8 pages.

*Primary Examiner* — Robert C Scheibel
(74) *Attorney, Agent, or Firm* — McAndrews, Held & Malloy, Ltd.

(57) ABSTRACT

Systems and methods are provided for in-vehicle data-driven connectivity optimization in a network of moving things. An on-board unit configured for deployment in a vehicle may obtain, during operations in an area of the network of moving things, connectivity-related data relating to coverage within the area, and generate or update, based on processing of the obtained connectivity-related data, a networking decision model. The networking decision model is configured for optimizing connectivity to the one or more access points in or associated with the network of moving things. The networking decision model may be shared with other on-board units deployed in other vehicles and/or with a Cloud-based network node in the network.

21 Claims, 10 Drawing Sheets

(56) References Cited

U.S. PATENT DOCUMENTS

| | | |
|---|---|---|
| 2018/0124664 A1* | 5/2018 | Lei .......................... H04L 67/12 |
| 2018/0189163 A1* | 7/2018 | Megahed ............ G06F 11/3006 |
| 2019/0234752 A1 | 8/2019 | Volos et al. |
| 2020/0053577 A1* | 2/2020 | Sundar .................... H04W 4/44 |
| 2020/0067793 A1* | 2/2020 | Dribinski ........ H04W 36/00837 |
| 2021/0045189 A1* | 2/2021 | de Moura ............... H04L 67/12 |

* cited by examiner

METHODS AND SYSTEMS FOR IN-VEHICLE DATA-DRIVEN CONNECTIVITY OPTIMIZATION IN A NETWORK OF MOVING THINGS

CLAIM OF PRIORITY

This patent application claims priority to and benefit from U.S. Provisional Patent Application Ser. No. 62/958,591, filed Jan. 8, 2020. The above identified application is hereby incorporated herein by reference in its entirety.

CROSS-REFERENCE TO RELATED APPLICATIONS/INCORPORATION BY REFERENCE

This patent application is related to:
U.S. Provisional Patent Application Ser. No. 62/221,997, entitled "Integrated Communication Network for a Network of Moving Things," filed Sep. 22, 2015;
U.S. Provisional Patent Application Ser. No. 62/222,016, entitled "Systems and Methods for Synchronizing a Network of Moving Things," filed Sep. 22, 2015;
U.S. Provisional Patent Application Ser. No. 62/222,042, entitled "Systems and Methods for Managing a Network of Moving Things," filed Sep. 22, 2015;
U.S. Provisional Patent Application Ser. No. 62/222,066, entitled "Systems and Methods for Monitoring a Network of Moving Things," filed Sep. 22, 2015;
U.S. Provisional Patent Application Ser. No. 62/222,077, entitled "Systems and Methods for Detecting and Classifying Anomalies in a Network of Moving Things," filed Sep. 22, 2015;
U.S. Provisional Patent Application Ser. No. 62/222,098, entitled "Systems and Methods for Managing Mobility in a Network of Moving Things," filed Sep. 22, 2015;
U.S. Provisional Patent Application Ser. No. 62/222,121, entitled "Systems and Methods for Managing Connectivity a Network of Moving Things," filed Sep. 22, 2015;
U.S. Provisional Patent Application Ser. No. 62/222,135, entitled "Systems and Methods for Collecting Sensor Data in a Network of Moving Things," filed Sep. 22, 2015;
U.S. Provisional Patent Application Ser. No. 62/222,145, entitled "Systems and Methods for Interfacing with a Network of Moving Things," filed Sep. 22, 2015;
U.S. Provisional Patent Application Ser. No. 62/222,150, entitled "Systems and Methods for Interfacing with a User of a Network of Moving Things," filed Sep. 22, 2015;
U.S. Provisional Patent Application Ser. No. 62/222,168, entitled "Systems and Methods for Data Storage and Processing for a Network of Moving Things," filed Sep. 22, 2015;
U.S. Provisional Patent Application Ser. No. 62/222,183, entitled "Systems and Methods for Vehicle Traffic Management in a Network of Moving Things," filed Sep. 22, 2015;
U.S. Provisional Patent Application Ser. No. 62/222,186, entitled "Systems and Methods for Environmental Management in a Network of Moving Things," filed Sep. 22, 2015;
U.S. Provisional Patent Application Ser. No. 62/222,190, entitled "Systems and Methods for Port Management in a Network of Moving Things," filed Sep. 22, 2015;
U.S. Provisional Patent Application Ser. No. 62/222,192, entitled "Communication Network of Moving Things," filed Sep. 22, 2015;
U.S. Provisional Patent Application Ser. No. 62/244,828, entitled "Utilizing Historical Data to Correct GPS Data in a Network of Moving Things," filed Oct. 22, 2015;
U.S. Provisional Patent Application Ser. No. 62/244,930, entitled "Using Anchors to Correct GPS Data in a Network of Moving Things," filed Oct. 22, 2015;
U.S. Provisional Patent Application Ser. No. 62/246,368, entitled "Systems and Methods for Inter-Application Communication in a Network of Moving Things," filed Oct. 26, 2015;
U.S. Provisional Patent Application Ser. No. 62/246,372, entitled "Systems and Methods for Probing and Validating Communication in a Network of Moving Things," filed Oct. 26, 2015;
U.S. Provisional Patent Application Ser. No. 62/250,544, entitled "Adaptive Rate Control for Vehicular Networks," filed Nov. 4, 2015;
U.S. Provisional Patent Application Ser. No. 62/273,878, entitled "Systems and Methods for Reconfiguring and Adapting Hardware in a Network of Moving Things," filed Dec. 31, 2015;
U.S. Provisional Patent Application Ser. No. 62/253,249, entitled "Systems and Methods for Optimizing Data Gathering in a Network of Moving Things," filed Nov. 10, 2015;
U.S. Provisional Patent Application Ser. No. 62/257,421, entitled "Systems and Methods for Delay Tolerant Networking in a Network of Moving Things," filed Nov. 19, 2015;
U.S. Provisional Patent Application Ser. No. 62/265,267, entitled "Systems and Methods for Improving Coverage and Throughput of Mobile Access Points in a Network of Moving Things," filed Dec. 9, 2015;
U.S. Provisional Patent Application Ser. No. 62/270,858, entitled "Channel Coordination in a Network of Moving Things," filed Dec. 22, 2015;
U.S. Provisional Patent Application Ser. No. 62/257,854, entitled "Systems and Methods for Network Coded Mesh Networking in a Network of Moving Things," filed Nov. 20, 2015;
U.S. Provisional Patent Application Ser. No. 62/260,749, entitled "Systems and Methods for Improving Fixed Access Point Coverage in a Network of Moving Things," filed Nov. 30, 2015;
U.S. Provisional Patent Application Ser. No. 62/273,715, entitled "Systems and Methods for Managing Mobility Controllers and Their Network Interactions in a Network of Moving Things," filed Dec. 31, 2015;
U.S. Provisional Patent Application Ser. No. 62/281,432, entitled "Systems and Methods for Managing and Triggering Handovers of Mobile Access Points in a Network of Moving Things," filed Jan. 21, 2016;
U.S. Provisional Patent Application Ser. No. 62/268,188, entitled "Captive Portal-related Control and Management in a Network of Moving Things," filed Dec. 16, 2015;
U.S. Provisional Patent Application Ser. No. 62/270,678, entitled "Systems and Methods to Extrapolate High-Value Data from a Network of Moving Things," filed Dec. 22, 2015;
U.S. Provisional Patent Application Ser. No. 62/272,750, entitled "Systems and Methods for Remote Software Update and Distribution in a Network of Moving Things," filed Dec. 30, 2015;
U.S. Provisional Patent Application Ser. No. 62/278,662, entitled "Systems and Methods for Remote Configuration Update and Distribution in a Network of Moving Things," filed Jan. 14, 2016;

U.S. Provisional Patent Application Ser. No. 62/286,243, entitled "Systems and Methods for Adapting a Network of Moving Things Based on User Feedback," filed Jan. 22, 2016;

U.S. Provisional Patent Application Ser. No. 62/278,764, entitled "Systems and Methods to Guarantee Data Integrity When Building Data Analytics in a Network of Moving Things," Jan. 14, 2016;

U.S. Provisional Patent Application Ser. No. 62/286,515, entitled "Systems and Methods for Self-Initialization and Automated Bootstrapping of Mobile Access Points in a Network of Moving Things," filed Jan. 25, 2016;

U.S. Provisional Patent Application Ser. No. 62/295,602, entitled "Systems and Methods for Power Management in a Network of Moving Things," filed Feb. 16, 2016;

U.S. Provisional Patent Application Ser. No. 62/299,269, entitled "Systems and Methods for Automating and Easing the Installation and Setup of the Infrastructure Supporting a Network of Moving Things," filed Feb. 24, 2016;

U.S. Provisional Patent Application Ser. No. 62/823,736, filed Mar. 26, 2019;

U.S. Provisional Patent Application Ser. No. 62/856,448, filed Jun. 3, 2019;

U.S. Provisional Patent Application Ser. No. 62/863,393, filed Jun. 19, 2019;

U.S. Provisional Patent Application Ser. No. 62/882,900, filed Aug. 5, 2019;

U.S. Provisional Patent Application Ser. No. 62/942,231, filed Dec. 2, 2019; and U.S. Provisional Patent Application Ser. No. 62/942,232, filed Dec. 2, 2019.

Each of the above identified applications is hereby incorporated herein by reference in its entirety for all purposes.

BACKGROUND

Current communication networks may be unable to adequately support communication environments involving static and mobile nodes, including, for example, autonomous vehicles. As a non-limiting example, current communication networks are unable to support adequately a network comprising a complex array of both moving and static nodes (e.g., the Internet of moving things, autonomous vehicle networks, etc.).

Limitations and disadvantages of conventional methods and systems will become apparent to one of skill in the art, through comparison of such approaches with some aspects of the present methods and systems set forth in the remainder of this disclosure with reference to the drawings.

BRIEF SUMMARY

Various aspects of this disclosure provide communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals. In various example implementations in accordance with the present disclosure, such communication networks may be configured for supporting in-vehicle data-driven connectivity optimization in a network of moving things.

DETAILED DESCRIPTION

Figure 1:
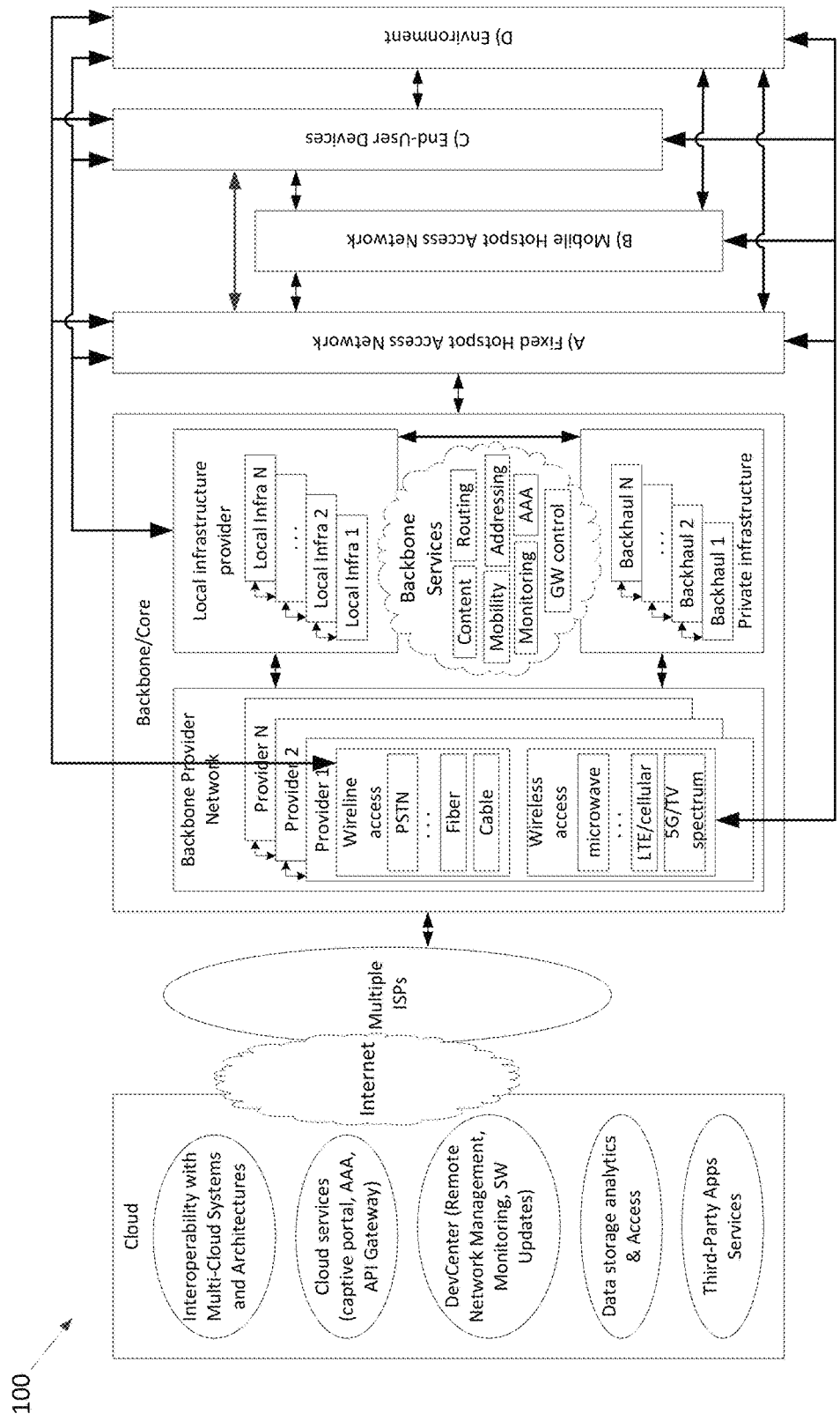
FIG. 1 shows a block diagram of a communication network, in accordance with various aspects of this disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry, for example, may operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module", for example, may refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g.," set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example, an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments, for example, may include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform, for example, may operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform, for example, may be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters, for example, may be derived locally, gathered from a neighborhood, fixed APs, the Cloud, etc. Various aspects of the platform also, for example, may ask for historical information to feed any of the decisions, where such information can be derived from historical data, from surveys, from simulators, etc. Various aspects of the platform additionally, for example, may probe or monitor decisions made throughout the network, for example to evaluate the network and/or the decisions themselves in real-time. Various aspects of the platform further, for example, may enforce the decisions in the network (e.g., after evaluating the probing results). Various aspects of the platform, for example, may establish thresholds to avoid any decision that is to be performed constantly or repeatedly without any significant advantage (e.g., technology change, certificate change, IP change, etc.). Various aspects of the platform also, for example, may learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not to be performed by the particular example subsystem or by a single subsystem. For example, the subsystems present herein may interact with each other, and data or control services may be deployed either in a centralized way, or by having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization, for example, may provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to expand effectively their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, mobile AP, MAP, etc. The OBU, for example, may comprise a plurality of networking interfaces (e.g., Wi-Fi, 802.11p, 4G, Bluetooth, UWB, etc.). The OBU, for example, may be readily installed in or on private and/or public vehicles (e.g., individual user vehicles, vehicles of private fleets, vehicles of public fleets, etc.). The OBU, for example, may be installed in transportation fleets, waste management fleets, law enforcement fleets, emergency services, road maintenance fleets, taxi fleets, aircraft fleets, etc. The OBU, for example, may be installed in or on a vehicle or other structure with free mobility or relatively limited mobility. The OBU also, for example, may be carried by a person or service animal, mounted to a bicycle, mounted to a moving machine in general, mounted to a container, etc.

The OBUs, for example, may operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets, for example, may form an overall mesh of communication links, for example including the OBUs and also fixed access points (APs) connected to the wired infrastructure (e.g., a local infrastructure, etc.). Note that OBUs herein may also be referred to as "mobile APs," "mobile hotspots," "MAPs," etc. Further, it should be noted that fixed access points may also be referred to herein as Road Side Units (RSUs), fixed APs (FAPs), etc.

In an example implementation, the OBUs may communicate with the fixed APs utilizing a relatively long-range protocol (e.g., 802.11p, etc.), and the fixed APs may, in turn, be hard wired to the wired infrastructure (e.g., via cable, tethered optical link, etc.). Note that fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU, for example, may comprise a robust vehicular networking module (e.g., a Wi-Fi connection manager) which builds on long-range communication protocol capability (e.g., 802.11p, etc.). For example, in addition to comprising 802.11p (or other long-range protocol) capability to communicate with fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a fixed AP, may be utilized to provide a fail-over communication link, may be utilized for emergency communications, may be utilized to subscribe to local infrastructure access, etc. The cellular network interface also, for example, may be utilized to allow the deployment of solutions that are dependent on the cellular network operators.

An OBU, in accordance with various aspects of the present disclosure, may for example comprise a smart Wi-Fi connection manager that can select the best available wireless link(s) (e.g., Wi-Fi, 802.11p, cellular, vehicle mesh, etc.) with which to access the Internet. The OBU also, for example, may provide geo-location capabilities (e.g., GPS, etc.), motion detection sensors to determine if the vehicle is in motion, and a power control subsystem (e.g., to ensure that the OBU does not deplete the vehicle battery, etc.). The OBU, for example, may comprise any or all of the sensors (e.g., environmental sensors, etc.) discussed herein.

The OBU also, for example, may comprise a manager that manages machine-to-machine data acquisition and transfer (e.g., in a real-time or delay-tolerant fashion) to and from the Cloud. For example, the OBU may log and/or communicate information of the vehicles.

The OBU, for example, may comprise a connection and/or routing manager that operates to perform routing of communications in a vehicle-to-vehicle/vehicle-to-infrastructure multi-hop communication. A mobility manager (or controller, MC), for example, may ensure that communication sessions persist over one or more handoff(s) (also referred to herein as a "handover" or "handovers") (e.g., between different mobile APs, fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a fixed AP (or distributed system thereof), as part of an OBU (or a distributed system thereof), etc. Various non-limiting examples of system components and/or methods are provided in U.S. Provisional Patent Application No. 62/222, 098, filed Sep. 22, 2015, and entitled "Systems and Method for Managing Mobility in a Network of Moving Things," the entire contents of which are hereby incorporated herein by reference. Note that in an example implementation including a plurality of MCs, such MCs may be co-located and/or may be geographically distributed.

It should be understood that the term "vehicle" includes "autonomous vehicles" and "driver assisted vehicles," as well as any other type of vehicles. For example, a vehicle may be, as examples, and without limitation, a node for use on land and/or under land, watercraft for use on water and/or under water (e.g., boats, ships, speedboats, tugboats, barges, submarines, etc.), aircraft/spacecraft for use in air and/or space (e.g., drones, airplanes, satellites, etc.). The applications within a vehicle may be applicable to the operation of the vehicle, or may be applications used by a passenger in the vehicle. For example, if the vehicle is an autonomously operating bus, in addition to the vast amounts of data needed for the operation of the bus, there may be numerous passengers in the bus that are receiving data (streaming movies, songs, etc.) or transmitting data (uploading videos/pictures, chats, etc.).

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure, for example, may support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof), for example, may be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU, for example, may process the data in any manner deemed advantageous by the system. The OBU, for example, may send the collected data (e.g., raw data, pre-processed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU, for example, may be operable to communicate with any of a variety of Wi-Fi-enabled sensor devices equipped with a heterogeneous collection of environmental sensors. Such sensors, for example, may comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors, for example, may comprise sensors and/or systems associated with on-board diagnostic (OBD) units for vehicles, autonomous vehicle driving systems, etc. Such sensors, for example, may comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors, for example, may comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to communicate periodically with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the mobile AP (e.g., vehicle-mounted sensors). Note that the sensor may also (or alternatively) be mobile (e.g., a sensor mounted to another vehicle passing by a mobile AP or fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities, for example, may quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Further, the example network 100 (and/or network components), for example, may share any or all characteristics with the other example networks (and/or network components) 200, 300, 400, 500-570, and 600, discussed herein.

The example network 100, for example, comprises a Cloud that may, for example comprise any of a variety of network level components. The Cloud, for example, may comprise any of a variety of server systems executing applications that monitor and/or control components of the network 100. Such applications also, for example, may manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud, for example, may manage interoperability with various multi-Cloud systems and architectures. Another example component (e.g., a Cloud service component), for example, may provide various Cloud services (e.g., captive portal services, authentication, authorization, and accounting (AAA) services, API Gateway services, etc.). An additional example component (e.g., a DevCenter component), for example, may provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud, for example, may be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core, for example, may comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core also, for example, may comprise one or more Local Infrastructure Providers. The Backbone/Core also, for example, may comprise a private infrastructure (e.g., run by the network 100 implementer, owner, etc.). The Backbone/Core, for example, may provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core, for example, may comprise and/or interface with different Authentication, Authorization, and Accounting (AAA) mechanisms.

The Backbone/Core Infrastructure, for example, may support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., mobile APs or OBUs (On Board Units), fixed APs or RSUs (Road Side Units), MCs (Mobility Controllers) or LMAs (Local Mobility Anchors) or Network Controllers, etc.) and/or third-party systems.

The Backbone/Core Infrastructure, for example, may comprise the ability to utilize and/or interface with different data storage/processing systems (e.g., MongoDB, MySQL, Redis, etc.). The Backbone/Core Infrastructure further, for example, may provide different levels of simultaneous access to the infrastructure, services, data, etc.

Figure 2:
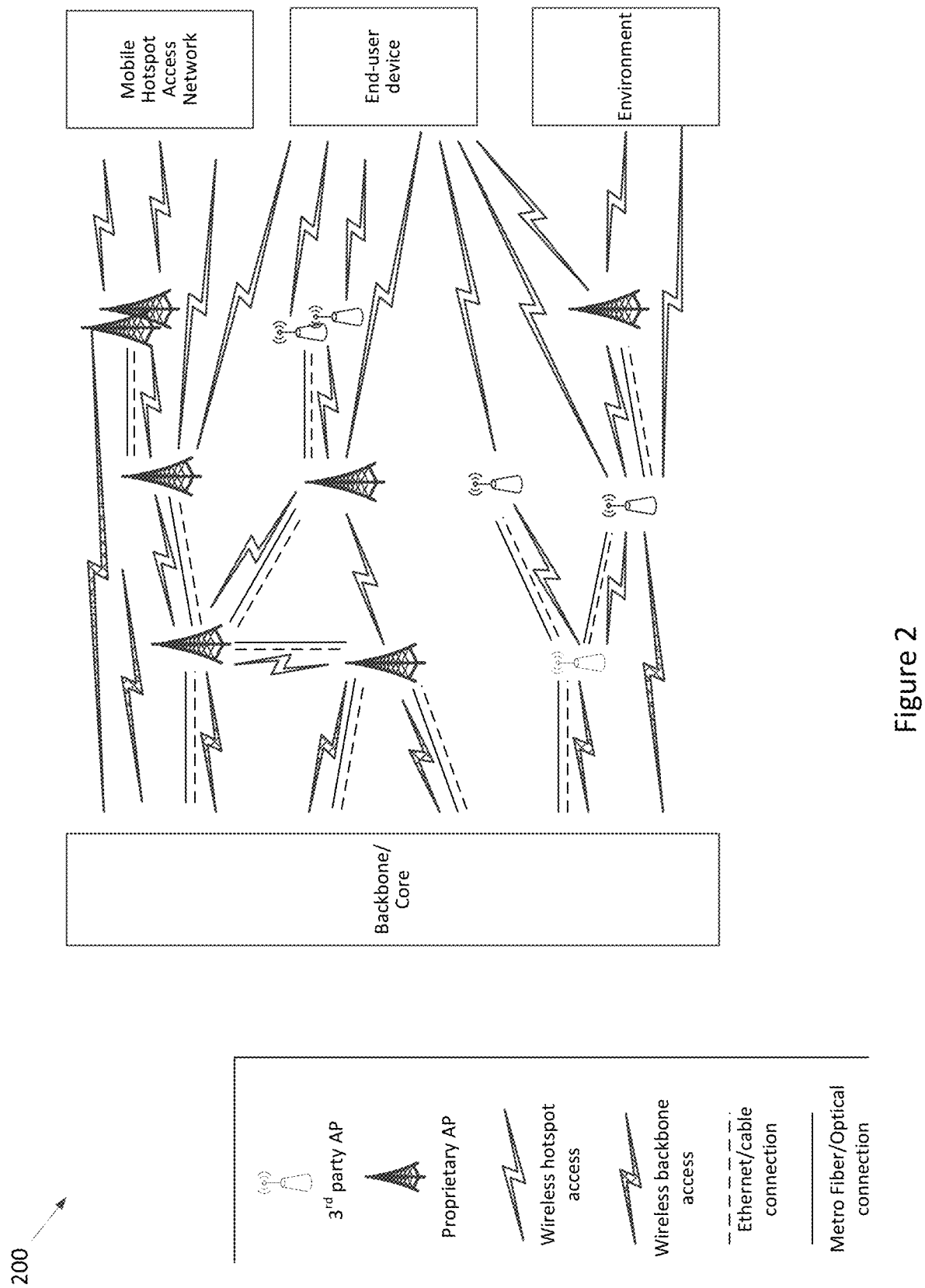
FIG. 2 shows a block diagram of a communication network, in accordance with various aspects of this disclosure.

The example network 100 also, for example, may comprise a Fixed Hotspot Access Network. Various example characteristics of such a Fixed Hotspot Access Network 200 are shown at FIG. 2. The example network 200, for example, may share any or all characteristics with the other example networks (and/or network components) 100, 300, 400, 500-570, and 600, discussed herein.

In the example network 200, the fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a fixed AP with no cable power source that can be placed virtually anywhere).

In the example network 200, the same fixed AP can simultaneously provide access to multiple fixed APs, mobile APs (e.g., vehicle OBUs, etc.), devices, user devices, sensors, things, etc. For example, a plurality of mobile hotspot access networks (e.g., OBU-based networks, etc.) may utilize the same fixed AP. Also for example, the same fixed AP can provide a plurality of simultaneous accesses to another single unit (e.g., another fixed AP, mobile AP, device, etc.), for example utilizing different channels, different radios, etc.).

Note that a plurality of fixed APs may be utilized for fault-tolerance/fail-recovery purposes. In an example implementation, a fixed AP and its fail-over AP may both be normally operational (e.g., in a same switch). Also for example, one or more fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Further, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
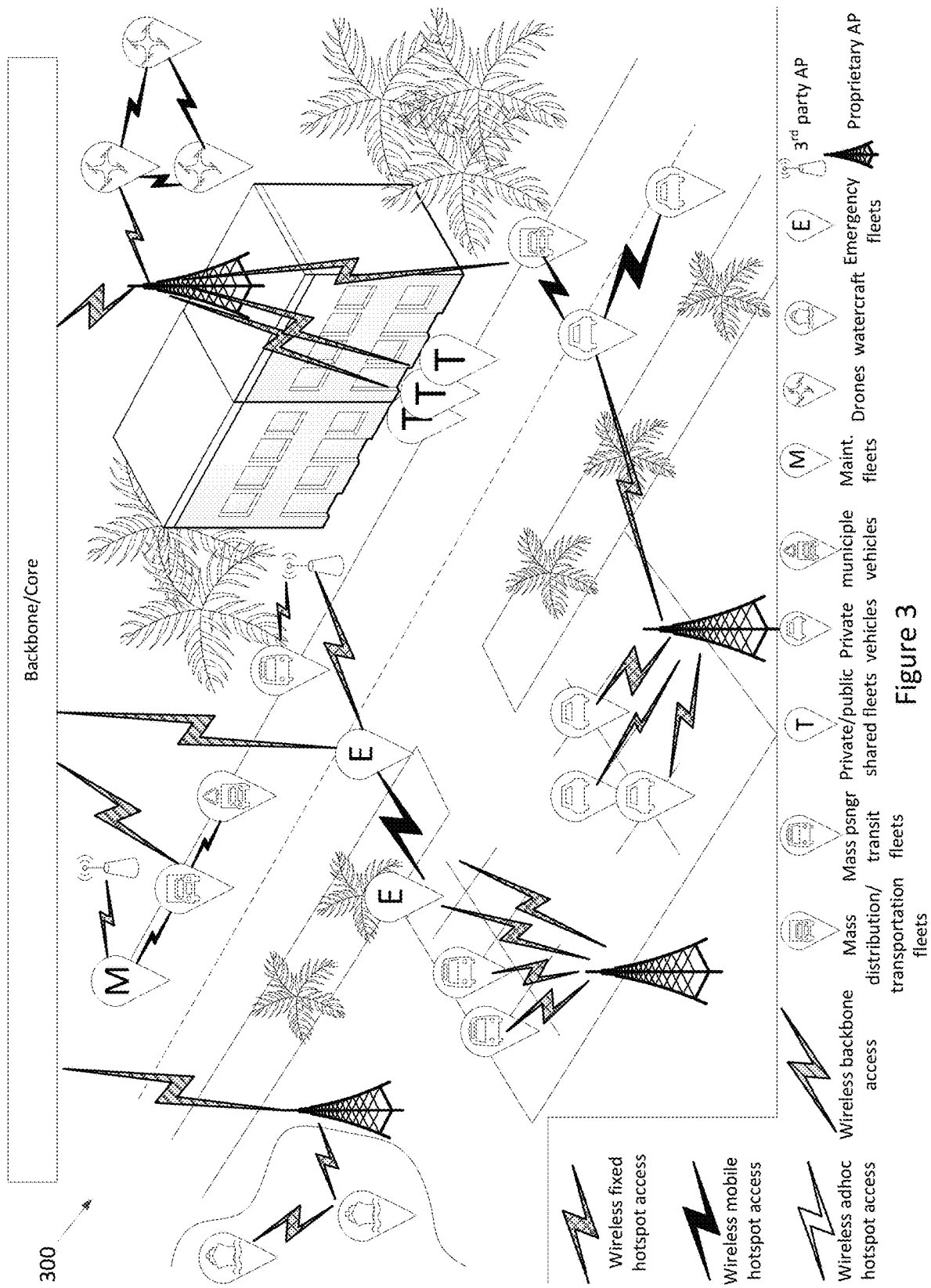
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., fixed APs) are also illustrated. The example network 300, for example, may share any or all characteristics with the other example networks (and/or network components) 100, 200, 400, 500-570, and 600, discussed herein.

The example network 300 comprises a wide variety of mobile APs (or hotspots) that provide access to user devices, provide for sensor data collection, provide multi-hop connectivity to other mobile APs, etc. For example, the example network 300 comprises vehicles from different fleets (e.g., aerial, terrestrial, underground, (under) water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of client's networking needs, many of examples of which are provided herein. For example, two mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
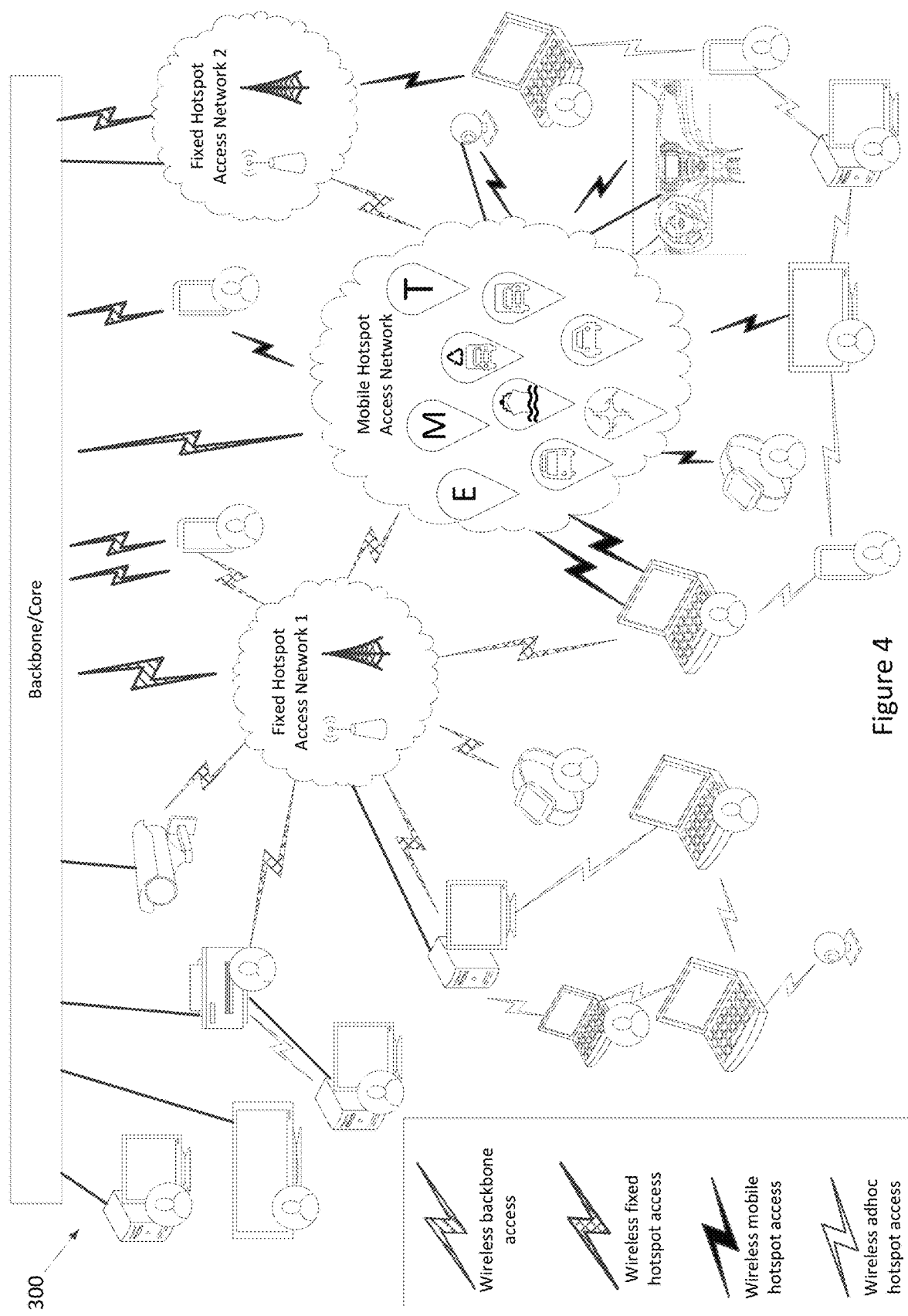
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400, for example, may share any or all characteristics with the other example networks (and/or network components) 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g., any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device, for example, may operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein), for example, may have redundant technologies to access distinct backbone, fixed hotspot, and/or mobile hotspot access networks, for example for fault-tolerance and/or load-balancing purposes (e.g., utilizing multiple SIM cards, etc.). A device also, for example, may simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
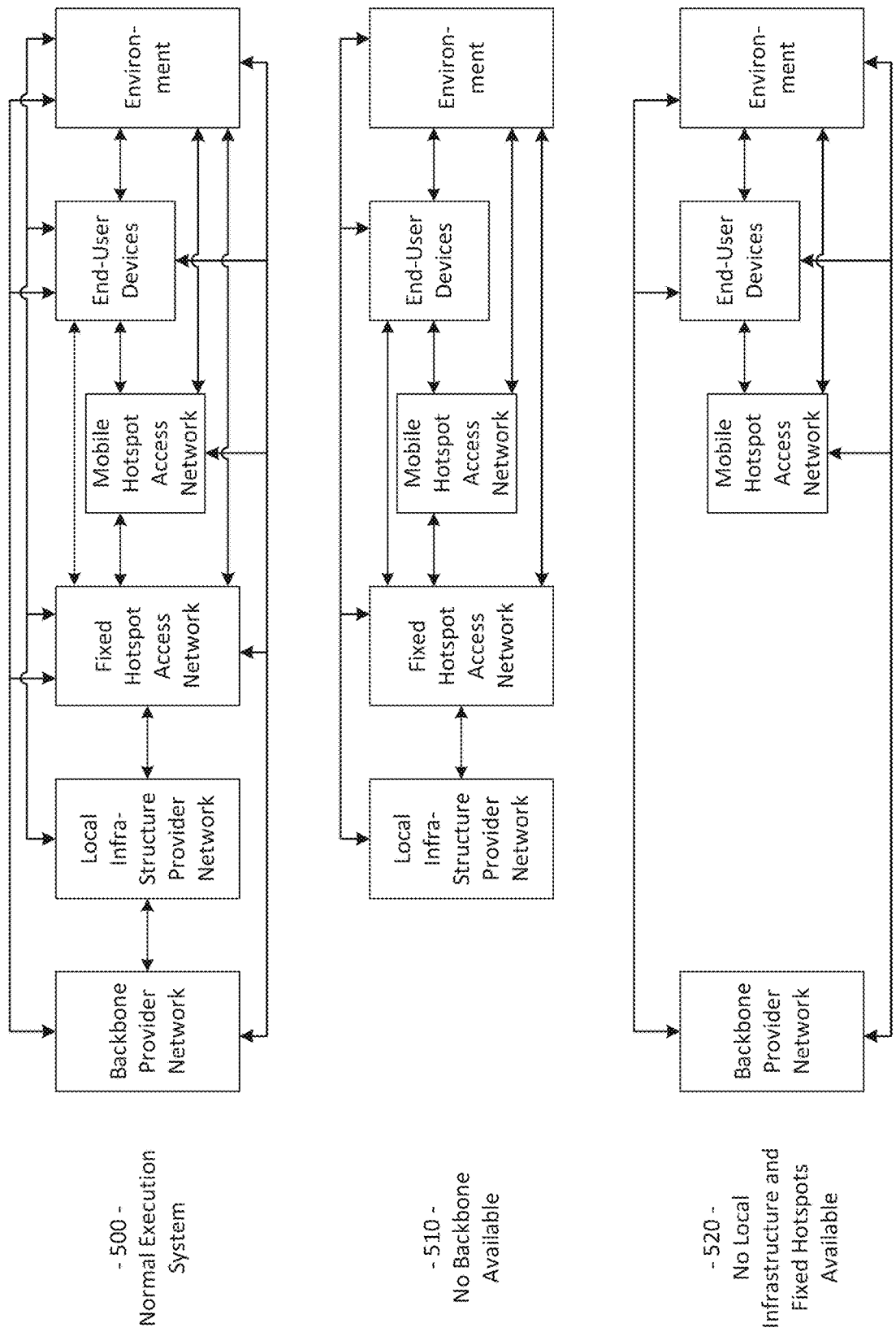
FIGS. 5A-5C show a plurality of network configurations illustrating the flexibility and/or and resiliency of a communication network, in accordance with various aspects of this disclosure.
Figure 5B:
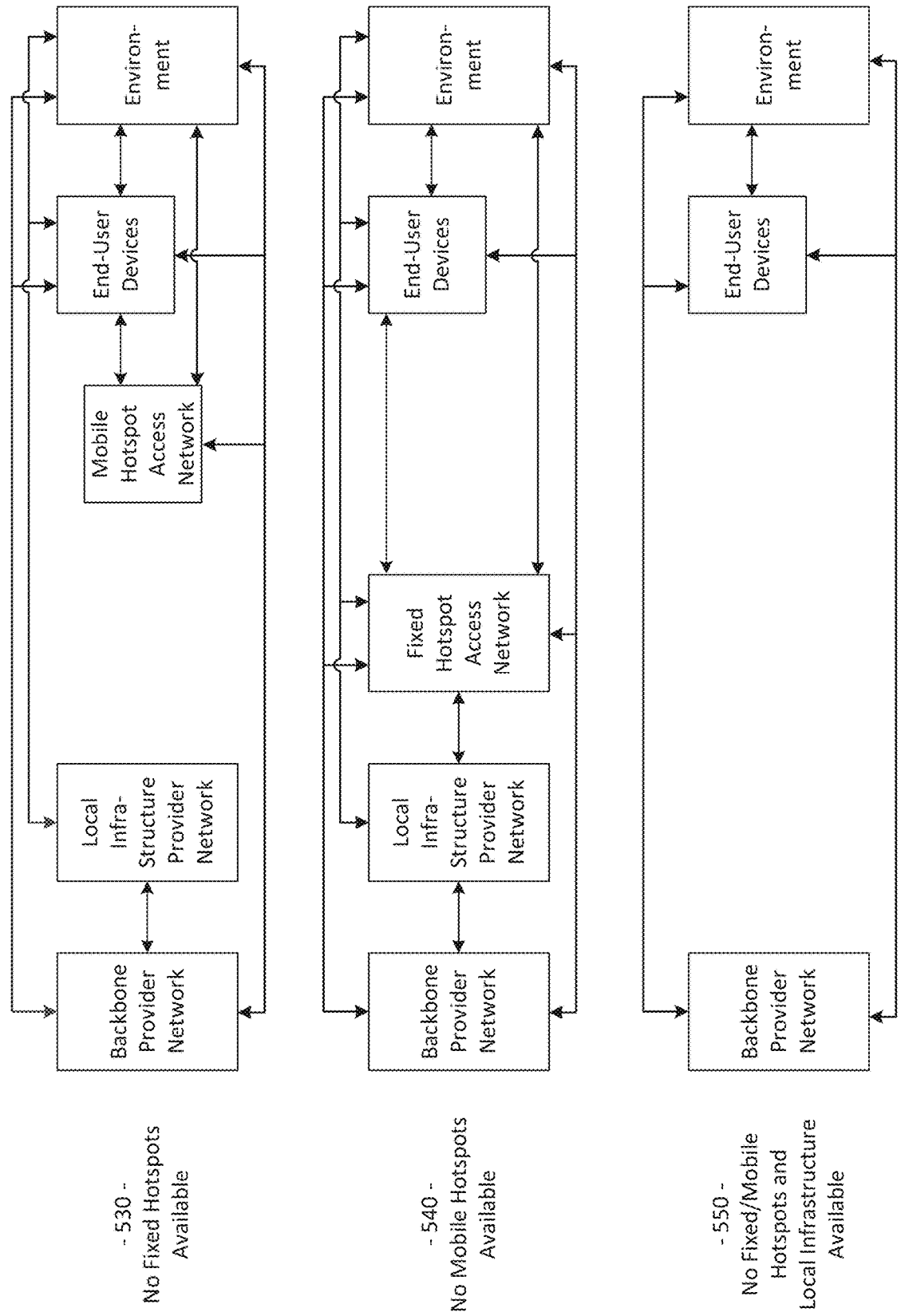
Figure 5C:
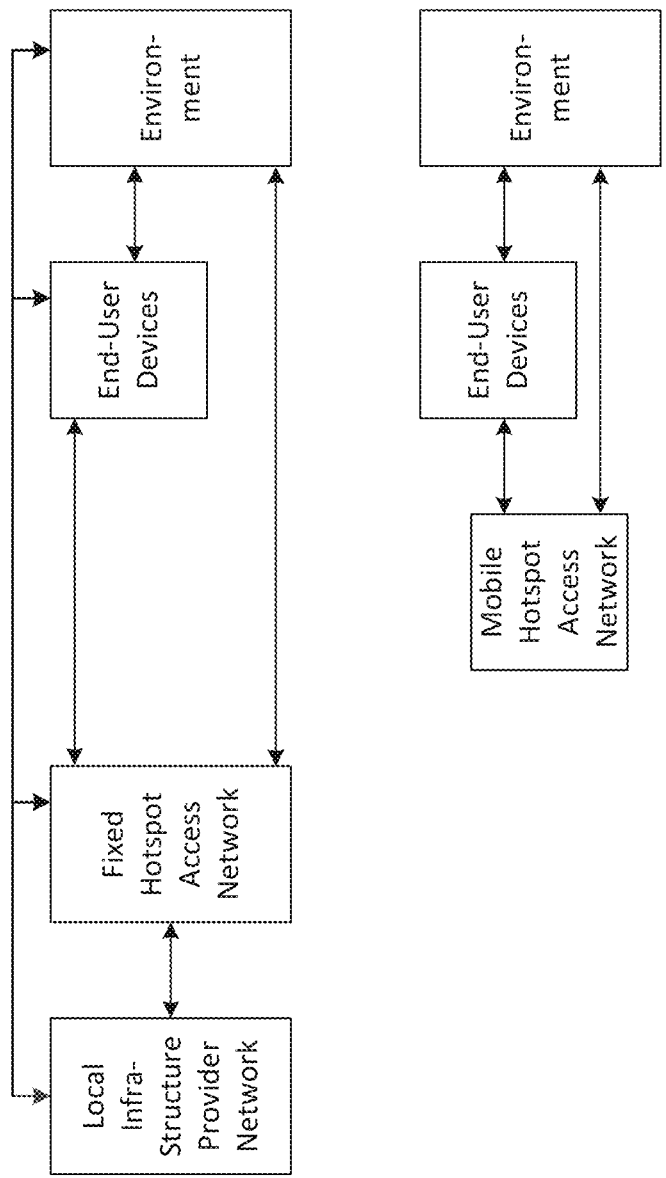

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570, for example, may share any or all characteristics with the other example networks (and/or network components) 100, 200, 300, 400, 600, and 700, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities, for example, may be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, such as a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Further, it should be noted that in various example implementations, any of such wireless links may comprise instead (or in addition) a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode), for example, may share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may comprise instead (or in addition) a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in mobile APs, fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode), for example, may share any or all characteristics with the first example mode 500, albeit without the local infrastructure provider network, the fixed hotspot access network, and communication links therewith.

For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may comprise instead (or in addition) a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP also, for example, may utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode), for example, may share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP also, for example, may utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530, for example, may be utilized in a scenario in which there is no fiber (or other) connection available for fixed APs (e.g., in a maritime scenario, in a plantation scenario, etc.), or in which a fixed AP is difficult to access or connect. For example, one or more mobile APs of the mobile hotspot access network may be used as gateways to reach the Cloud. The fourth example mode 530 also, for example, may be utilized when a vehicle fleet and/or the mobile APs associated therewith are owned by a first entity and the fixed APs are owned by another entity, and there is no present agreement for communication between the mobile APs and the fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode), for example, may share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with fixed APs, such communication may be utilized instead of mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode), for example, may share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 also, for example, may be utilized in rural areas in which mobile AP presence is sparse, fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode), for example, may share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the fixed APs.

Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode), for example, may share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single mobile AP, between clients of respective different mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies and/or multiple networks, connected to multiple moving/static things with multiple technologies and/or multiple networks, forming wireless (mesh) hotspot networks over different environments, connected to multiple wired/wireless infrastructure/network backbone providers, ultimately connected to the Internet, Cloud or private network infrastructure.

Figure 6:
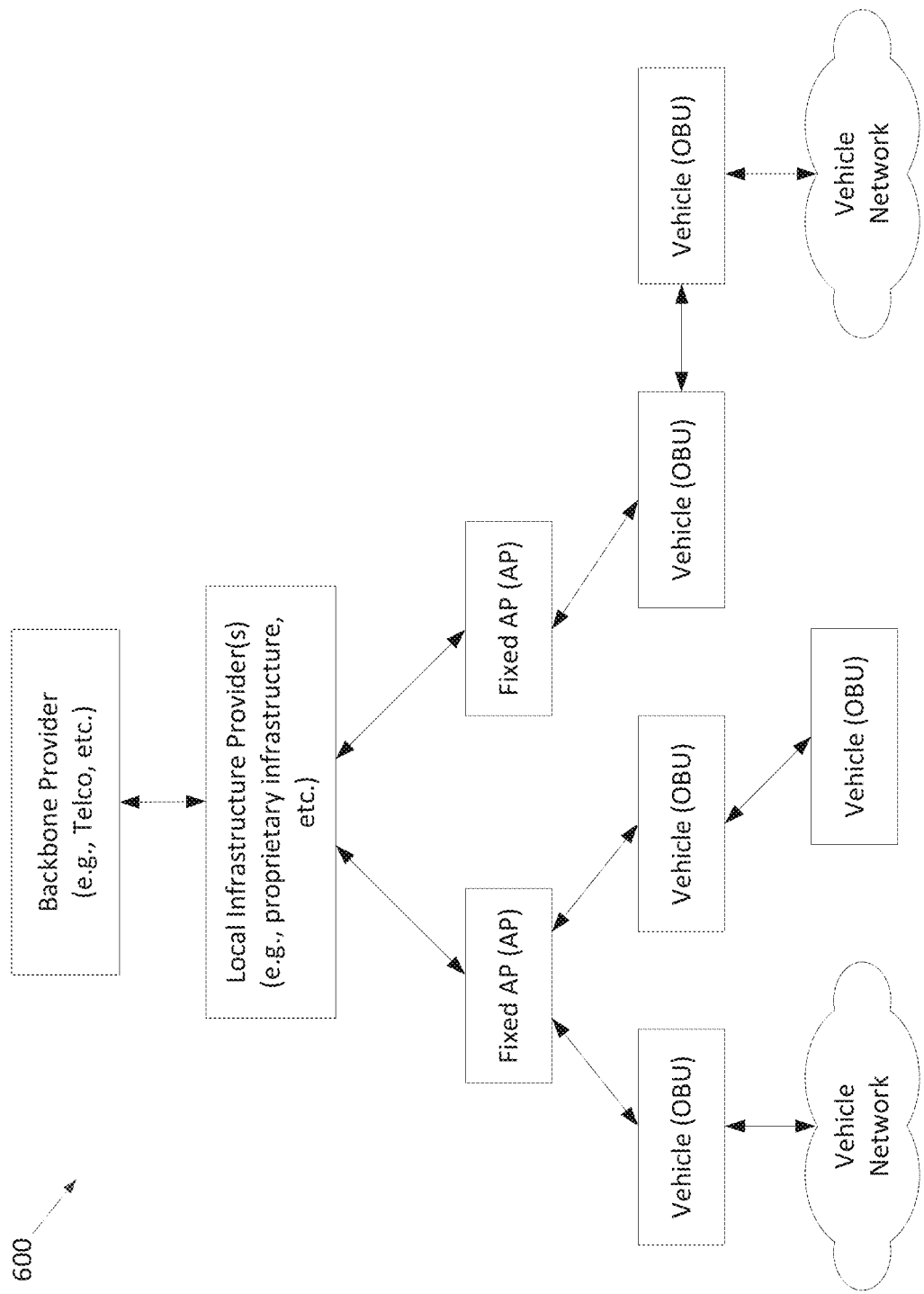
FIG. 6 shows a block diagram of an example communication network, in accordance with various aspects of the present disclosure.

FIG. 6 shows yet another block diagram of an example network configuration, in accordance with various aspects of the present disclosure. The example network 600, for example, may share any or all characteristics with the other example networks and/or network components 100, 200, 300, 400, 500-570, and 600, discussed herein. Notably, the example network 600 shows a plurality of mobile APs (or OBUs), each communicatively coupled to a fixed AP (or RSU), where each mobile AP may provide network access to a vehicle network (e.g., comprising other vehicles or vehicle networks, user devices, sensor devices, etc.).

In some instances, the various resources and/or capabilities available in networks of moving things (e.g., a vehicle network, a network of or including autonomous vehicles, etc.) may be utilized to optimize operations and/or services in such networks. In various implementations in accordance with the present disclosure, for example, such networks may be configured for supporting use of in-vehicle data-driven connectivity optimization, as described in more detail below.

Figure 7:
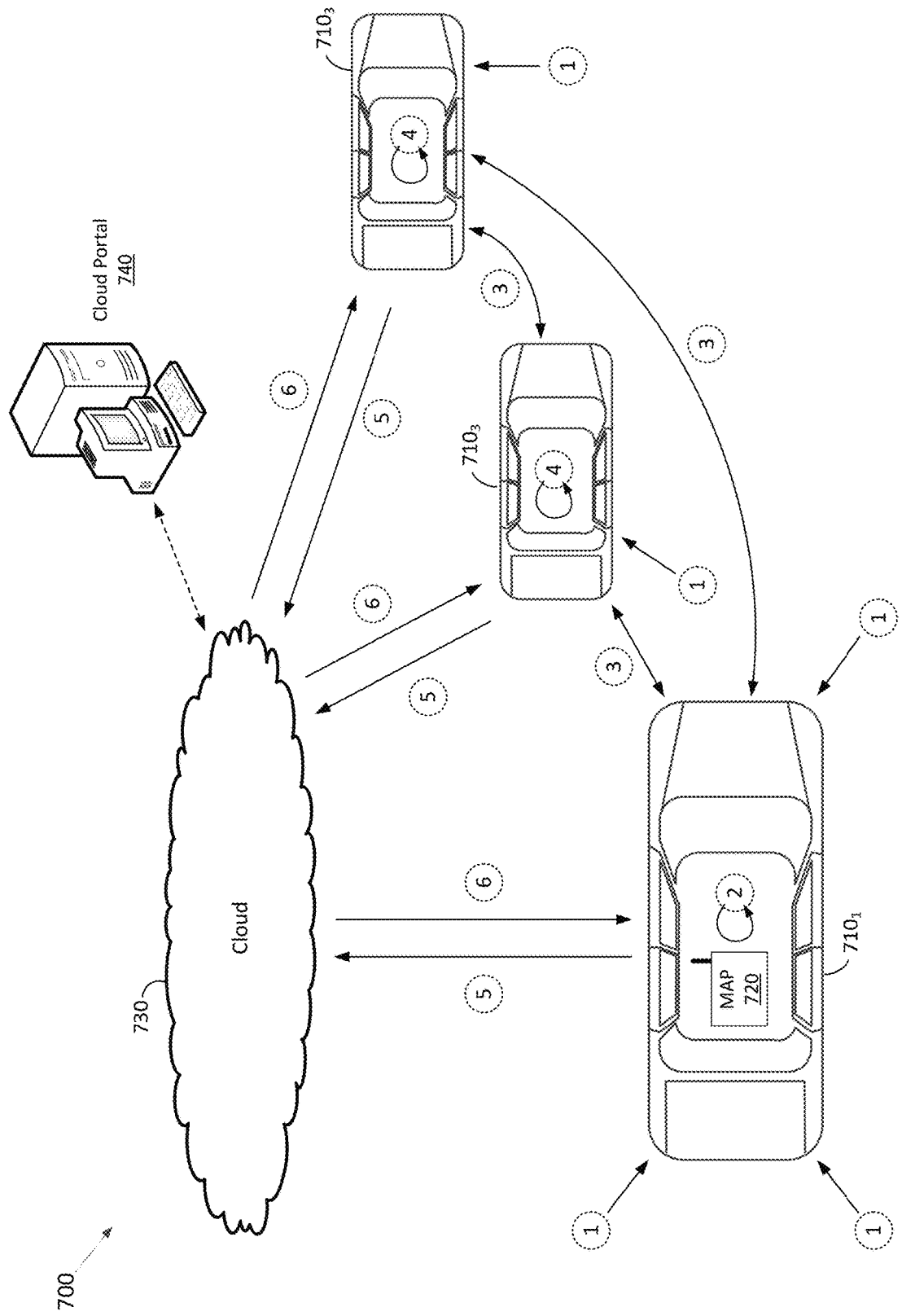
FIG. 7 shows an example communication network that supports in-vehicle data-driven connectivity optimization in a network of moving things, in accordance with various aspects of the present disclosure.

FIG. 7 shows an example communication network that supports in-vehicle data-driven connectivity optimization in a network of moving things, in accordance with various aspects of the present disclosure. Shown in FIG. 7 is an example network 700.

The example network 700 may, for example, share any or all characteristics with the example networks 100, 200, 300, 400, 500-570, and 600 (and/or network components thereof), discussed herein. In this regard, the network 700 may be a network of moving things (e.g., a vehicle network, a network of or including autonomous vehicles, etc.), or at least a portion of a network of moving things. As shown in FIG. 7, a plurality of vehicles 710 may operate in the network 700, each comprising mobile access point (MAP) or on-board unit (OBU) 720, configured to provide online access and/or connectivity, such as between the vehicles and a centralized common entity 730 (e.g., an Internet-based Cloud), within a vehicle network (e.g., comprising other vehicles or vehicle networks, user devices, sensor devices, etc.). In some instances, at least some of the vehicles 710 may be autonomous vehicles (AVs).

The mobile APs may utilize multiple communication technologies and/or interfaces. For example, while not shown in FIG. 7, mobile access points (MAPs), such as the MAP 720, may be communicatively coupled to the Cloud 730 using dedicated short range communications (DSRC) based links, such as via fixed access points (FAPs), using cellular based links, such as via a cellular base stations, etc. Further, mobile access points (MAPs), such as the MAP 720, may also support multiple technologies and/or interfaces (e.g., Wi-Fi, Ethernet, etc.), and/or connectivity using multiple networks (e.g., corresponding to the same type or types of technologies or network interfaces), with the vehicle networks serviced by these mobile APs.

The Cloud 730 may provide centralized support within the network 700, such as by incorporating or configuring components therein for performing various functions required for supporting operations and/or services that may need to be done in centralized manner in the network 700 (e.g., where resources available in the nodes may not be adequate, where use of resources in the node may be need to be reduced, where network-level processing and/or control may be needed or desirable, etc.).

In the example implementation shown in FIG. 7, for example, a Cloud portal 740 (e.g., a server or any other suitable platform) may be used, and is configured to perform, manage, and control functions attributed to the Cloud. The Cloud portal 740 may comprise suitable circuitry (including, e.g., one or more of communication circuit(s), circuit(s), processing circuit(s), etc.) for performing the various functions and/or operations attributed to the Cloud portal 740. Nonetheless, while the Cloud portal 740 is illustrated as a single device/system, the disclosure is not so limited. In this regard, in some instances, solutions in accordance with the present disclosure may be implemented in a distributed manner, with various functions attributed to the Cloud 730 being performed by various components of the network, including within and/or external to the Cloud 730. Thus, in some example implementations, the Cloud portal 740 may be implemented in a distributed manner, with some of the functions and/or operations attributed thereto being performed by different physical devices or components that are part of and/or connected to the Internet/Cloud 730.

In accordance with the present disclosure, vehicle networks (e.g., the example network 700 of FIG. 7) may be configured for in-vehicle data-driven connectivity optimization. In this regard, in some existing solutions, vehicles operating in vehicle networks may be configured to make intelligent network decisions, namely at wireless connection management level, such as based on leveraging of context and network metadata collected during the vehicles' experiences and/or based on vehicles' interactions with wireless network infrastructure throughout their routes. The context and network metadata may be shared with a common entity, e.g., the Cloud 730, which may be configured to gather (e.g., collect or receive) information from several vehicles and to build models upon which vehicles may make their wireless connectivity decisions. These existing solutions do not take full advantage of vehicle's computational capabilities, however, since network decisions models are centralized in the Cloud.

Thus, in accordance with solutions based on the present disclosure, wireless connectivity decisions may be decentralized by leveraging on vehicles' intelligence and their interactions with other vehicles and the infrastructure. Such decentralization may offer many benefits and/or advantages. For example, decentralization of wireless connectivity decisions may allow for faster information dissemination (e.g., vehicles are able to share metadata among them through vehicle-to-vehicle (V2V) technologies).

The decentralization of wireless connectivity decisions may also allow for more accurate/fresher metadata. This may be because vehicles often perform common routes so they can rapidly share and update their metadata regarding a region; due to lower latency access to vehicle's current context including mobility, operating mode (e.g., emergency vs. normal circulation), available computational resources, and density of nearby vehicles), etc. The decentralization of wireless connectivity decisions may also allow for less exchange of metadata between vehicles and the Cloud, resulting in lower data communication costs and higher capacity to send (e.g., application related) data. The decentralization of wireless connectivity decisions may also allow for lower Cloud resources (and thus costs), since the Cloud does not need to collect and process all raw metadata from all vehicles. Thus, the decentralization of wireless connectivity decisions may lead to more up-to-date decision models (more and with faster iterations).

However, the Cloud may still be included for connectivity management when using such solutions that allow for decentralization of wireless connectivity decisions. In this regard, despite the network decisions decentralization, the Cloud may have a general view of the system. Thus, in various implementations, hybrid solutions are used where the vehicles behave as decision nodes and share their learnings and/or models with the Cloud, in a periodic or triggered-basis way, and the Cloud may also act as a decision node by interacting with the vehicles, in order to impose/suggest/prioritize decisions that might be more adequate for a specific vehicle or at fleet level.

In various example implementations, vehicles may be configured to make use of their computational capabilities in order to build decision models that aim to optimize wireless performance connectivity on-demand/real-time throughout their routes. In this regard, the vehicles may be configured to collect context metadata (e.g., position, access points' locations and signal strength related data, etc.) and network metadata (e.g., throughput measurements, latency measurements, etc.). The vehicles may then be capable of building and/or adjusting (e.g., to improve) their own models based on the collected metadata—that is, via computation on the edge. The vehicles may also execute local decisions. Further, the vehicles may use V2V technology in order to share collected/obtained information as well as learnings/conclusions, to allow the vehicles collectively and individually improve the models used thereby. Thus, vehicles may be able to select the best model from the ones available and/or to configure the model properly, based on the context information.

In various example implementations, vehicles may interact with various different network components (e.g., within the vehicle network), such as for exchanging information therewith, as well as for use in support of in-vehicle connectivity management. For example, the vehicles may interact with, and exchange information with surrounding environment and network access points; other vehicles (e.g., of a fleet that include the vehicle) as nodes to share learnings and/or models/partial models; the Cloud, as a central entity with access to general information about the system and capable of modifying a local decision according to fleet and/or specific vehicle(s) requirements/needs.

With reference to FIG. 7, in an example use case scenario illustrated therein (with three vehicles $710_1$, $710_2$, and $710_3$ operating within the network 700), vehicle $710_1$ may collect (1) context metadata (e.g., position, access points' locations and signal strength related data, etc.) and network metadata (e.g., throughput measurements, latency measurements, etc.). The other vehicles ($710_2$ and $710_3$) may also collect (1) context and network metadata of their own. The vehicle $710_1$ processes and updates (2) the collected metadata. This may be done in order to build/iterate models. The processing of the collected metadata and building/updating of models based thereon are described in more detail below. The vehicle $710_1$ then shares (3) its learnings/models/partial models with other vehicles through V2V technology. The other vehicles ($710_2$ and $710_3$) update (4) their models with information received from other vehicles, and may also share (3) their learnings/models/partial models with other vehicles. The vehicles may share (5) learnings and/or models with the Cloud 730. The Cloud may then send (6) to one or more vehicles (or to the entire fleet) information based on received and processed vehicles' learnings and/or models—e.g., context-related metadata or local system requirements that influence the model to be chosen by specific vehicle(s).

Figure 8:
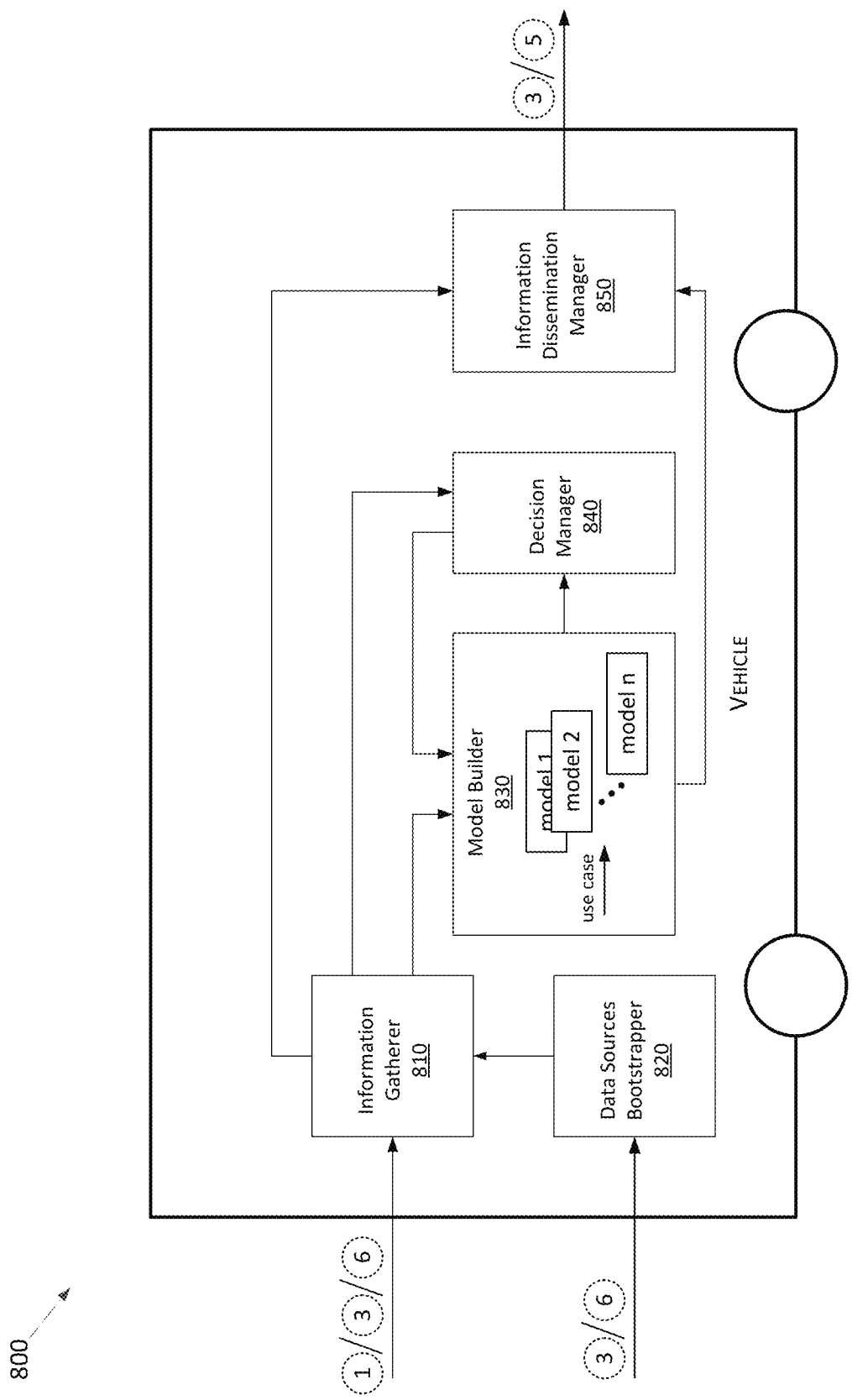
FIG. 8 shows an example system for in-vehicle data-driven connectivity optimization in a network of moving things, in accordance with various aspects of the present disclosure.

FIG. 8 shows an example system for in-vehicle data-driven connectivity optimization in a network of moving things, in accordance with various aspects of the present disclosure. Shown in FIG. 8 is an example in-vehicle system 800, which may be deployed within a vehicle that is configured for operation within a communication network supporting mobility based connectivity—e.g., the network 700 (or any of the example networks 100, 200, 300, 400, 500-570, and 600).

The system 800 may comprise suitable circuitry configured for supporting in-vehicle data-driven connectivity optimization in a network of moving things. In this regard, the system 800 may comprise existing circuitry and/or other resources (e.g., storage, communication, processing, etc.) already deployed in the vehicle, with such circuitry and/or other resources being configured to implement the elements and/or perform the functions of the system 800 as described herein. For example, as shown in FIG. 8, the system 800 may comprise an information gatherer 810, a data sources bootstrapper 820, a model builder 830, a decision manager 840, and an information dissemination manager 850.

The information gatherer 810 may be configured to gather all the information coming from different data sources (e.g., actions (1), (3), and (6) in the example use case scenario described with respect to FIG. 7), and to use the information, such as by providing the information as input to both of the model builder 830 and the decision manager 840, for use therein in providing in-vehicle management as described below. The information gatherer 810 may also provide information as direct input into the information dissemination manager 850, which is responsible for sharing metadata with other vehicles and the Cloud, as described below. The update frequency and/or granularity of the information gathered by the information gatherer 810 may be adaptable over time—e.g., according to several factors. Further, each type of data source collected might have its own configured update frequency.

For example, the frequency and/or the granularity of gathering of information may be based on one or more of system requirements (e.g., low power consumption, which implies less update frequency), data communication costs (e.g., in order to minimize communication costs, the update frequency of the data shared between vehicles can be decreased), and models stability (e.g., if the differences between successive model iterations are small, because the information is not new, the frequency of update can be decreased).

Examples of data sources from which information is collected (that is gathered) may comprise in-vehicle sensing, other vehicles, and the Cloud. For example, with respect to in-vehicle sensing, collected data may comprise data relating to vehicle's context related data, network data, and historical data. In this regard, vehicle's context may comprise location (including e.g., altitude when available), vehicle's speed and direction, current time, information about the users travelling inside the vehicle (e.g., data needs), etc.

Network related data may comprise scan related data (e.g., based on scans of available/visible network fixed access points (APs), along with information about the name of the wireless internet provider (SSID), signal strength, among other properties), and connection related data. The connection related data may comprise data relating to connections to fixed APs, including information about the APs to which the vehicle attempts to connect (including, e.g., information related to previous attempts to connect to the Aps). Connection related data may comprise data relating to one or more of: 1) location/speed/heading at the time of connection attempt, connection start and disconnection, 2) signal strength, 3) success of the connection attempt (able/not able to connect), 4) time required to connect to the AP and time to send the first byte through internet since scanning (when the connection is successful), 5) time the device was busy trying to connect (when the connection is unsuccessful), 6) connected time (when the connection is successful), 7) average, maximum and variation of throughput during the connection, 8) latency, and 9) amount of data sent and received—that is, network traffic.

With respect to historical data, the vehicle has the capability to store long periods of collected data from all the aforementioned sources. The amount of past experiences data that is logged might depend on the vehicle's storage capacity/a configured limit/detection of data stabilization for a long period (e.g., negligible data variations during the past hour(s)/day(s)/week(s)), which leads the vehicle to discard older samples. Examples of historical data sources are: vehicle's route; profile of users' data needs; APs characterization (e.g., success rate, e.g., number of failed/successful connection attempts).

With respect to other vehicles as data sources, vehicles that are within vehicle's V2V range might enrich the information gathered by the vehicle by sharing their learnings and/or models/partial models. Based on such sharing the vehicles are able not only to quickly build profiles of network/context elements without leveraging only on their own experiences, but also to have some kind of confirmation of their conclusions, which allows to detect some vehicle's specific problems that otherwise could be misled with poor network components performance (e.g., damaged wireless module, which hinders the connection to an AP).

Examples of vehicles-based gathered information may comprise APs profiles and information relating to resources needs/concurrency. APs profile may comprise information about fixed APs that the vehicle was not able to scan (e.g., were not visible to the vehicle); reinforcement on the information about specific APs, e.g., the success rate of an AP (so the vehicle is able to quickly update an AP profile even if its own connection experiences with an AP were few). With respect to resources needs/concurrency (and information relating thereto), whenever the vehicles are in a region where resources are scarce (e.g., few APs or few APs with a significant offload capacity per second are available), the vehicles might need to share their requirements with the others so that vehicles with more demanding or priority connectivity needs (e.g., an ambulance) have access to the best resources.

With respect to the Cloud as data source, in its function as a network/fleet information aggregator the Cloud may have a general view of the system, thus may provide additional information, such as regarding the vehicle and/or its context, and/or specific system requirements that might be critical to vehicle's decisions. Examples of vehicle and/or its context related information may comprise vehicle characterization and refresh/update data. In this regard, vehicle characterization may comprise type and priority (e.g., commuter vehicle, taxi, ambulance, etc.), wireless antenna profile (power, location).

With respect to refresh/update data, such data may comprise data that is sent to the vehicle in a periodic or in an event-basis way, which might regard current/temporary network elements' conditions (e.g., damaged AP); prioritization of the wireless providers to whom to connect to, which might be specific to the vehicle or to the fleet, since different providers allow for different amounts of data offload and have different data costs; learnings from other vehicles driving outside V2V range, such as APs rates, etc.

With respect to system requirements, despite having an objective function, e.g., to optimize wireless performance connectivity through a metric or a set of metrics that describe it (e.g., minimize latency, maximize throughput), the vehicles should generally give priority to the system requirements sent by the Cloud, which impose restrictions to the optimization criteria, thus to the model building. System requirements may be conditions to which the vehicle must comply such as, maximum values of latency, e.g., time to reach the internet (e.g., to send urgent messages in case of emergency vehicles or in situations where users are performing video calls), quality of service threshold, maximum system power consumption, data costs ceiling, resources concurrency issues (help on vehicles' prioritization in situations of concurrency, in order to fasten the decision process and/or spread the information to vehicles outside V2V range).

The data sources bootstrapper 820 may be activated whenever there is a gap between what the vehicle "knows" about a region/place and the amount and/or type of available information (e.g., the vehicle is aware of only 5% of the APs of a region), which prevents it from taking connectivity optimization-related decisions. These situations may occur, for example, when a vehicle drives into a region for the first time.

In such instances, where these situations causing such gap to occur may take place, the vehicle may notify the Cloud about the lack of information, and the Cloud would then execute a bootstrap. In this regard, in order to perform a bootstrap, the Cloud may communicate with a vehicle (or a group of vehicles), which may have been in that region (and as such, may have extensive information about the region), and request that information (including, e.g., built models) be shared with the vehicle. In this regard, the sharing of information may be done directly between the vehicles (e.g., step (3) as described with respect to FIG. 7), such as using V2V connections. Additionally or alternatively, the Cloud should request that information from other vehicles (step (5) as described with respect to FIG. 7) and send it to the vehicle(s) that need the bootstrap (step (6) as described with respect to FIG. 7). The Cloud may also use previously stored information (including, e.g., previously shared data) available in the Cloud (e.g., step (5) as described with respect to FIG. 7).

The amount/type of bootstrap data (e.g., complexity of a model) gathered by the vehicle may depend on various factors, such as vehicle profile and system properties and/or requirements. In this regard, the vehicle profile may comprise the type(s)/number of models the vehicle may need in order to take decisions (e.g., a priority vehicle should take more accurate decisions, thus is more likely to need greater variety and/or more complex models). The system properties and/or requirements (e.g., native storage capacity or requirements on low power consumption, which prevents from processing great amounts of data). When communicating to other vehicles, in order to request information, the Cloud may select the vehicle/group of vehicles in adaptive manner—e.g., selecting vehicle/group of vehicles that have a similar profile (e.g., data needs, system footprint) to the requester vehicle, in order to provide models that better approximate the vehicle needs/goals.

The model builder 830 may use data feed from the information gatherer 810 to build models and/or make predictions, which are feed into the decision manager 840. In normal operation conditions, that is, where sufficient data is available, the model builder 830 may use the different sources of data aforementioned, in order to build profiles (e.g., vehicle's routes, vehicle's speed, vehicle's stops/parking locations, probability of connection success to an AP) and study the relations between variables (e.g., distance of connection to an AP versus success of the connection and/or vehicle's speed), which allows to understand, model and predict behaviors (e.g., through the use of machine learning techniques) that help in the decision-making process.

Examples of models that may be generated/built may include a model that may relate best antenna transmission power with ranges of distances to an AP. Another example model may provide a score to each AP according to its performance (measured by several variables) and build a ranking list/several ranking lists according to the cost of each variable in the current context (e.g., the definition of best AP may vary according to the current system requirements, such as throughput capacity or maximization of the wireless connected time). Another example model may define a distance/signal strength to each AP, at which the vehicle should disconnect to and attempt to connect to another AP.

In special operation conditions, that is, where there is no or scarce data (e.g., due to lack of gathered information, failed bootstrap, no vehicles within range, and/or the need for fast decision), the vehicle should follow basic predefined heuristics. There might be several models for the same decisions. For example, in some instances, a single use case associated a system based on the implementation shown in FIG. 8 may have several models (e.g., from 1 to n). Different models require different amounts of historical data, different processing and storage capacity, different power consumption and time to compute. That way, there might be different levels of model accuracy for the same decision use-case.

The decision manager 840 selects the best model, for example, among those provided by the model builder 830, in each situation based on pre-set criteria, such as based on past experiences of the vehicle and vehicle's current context, which may be provided by the information gatherer 810. Thus, the vehicle may be able to adapt to different system/network conditions, e.g., decide on the model that best fits particular requirements. In this regard, the requirements may be determined (perceived) by the vehicle, such as current and historical users profile data needs, vehicle's priority, vehicle's route, etc. For example, in the case of a priority vehicle, the decision manager 840 may choose a model that makes use of a great amount of data in order to build a more accurate output; in the case of a user whose historic of data needs is known, the decision manager 840 might select a model (e.g., AP ranking list) that allows for seamless connectivity rather than a model that allows for great offload capacity, e.g., high throughput values.

The selection related requirements may also be received from and/or be set by external entity, such as the Cloud or other vehicle. For example, the Cloud may set or specify requirements for selecting of models, such as by specifying system footprint (e.g., low power consumption), quality of service, providers' prioritization by data cost, connection security, etc. If low power consumption as a system requirement is set or required by the Cloud, for example, the decision manager 840 may have to choose a "light" model, which makes use of few data sources and/or runs a low power computational algorithm, or a model that requires few iterations in order to converge to a solution, or even to update the model less frequently. Other vehicles may also be set or specify requirements for selecting of models, such as when there are resources concurrency.

In some instances, Cloud and priority vehicles requirements should take precedence over vehicle's ones (e.g., if the Cloud prioritizes a network provider, the vehicle should choose among the APs of that provider, even if they are not the best according to the metric/set of metrics defined to describe wireless performance connectivity optimization).

In some instances, decision models may change throughout the time for a same decision use-case, such as when context and network metadata change. This may be due to new metadata acquisition (e.g., AP success rate update, change of the users inside the vehicle), which causes new model iterations, or due to changes in system requirements (e.g., higher processing time is permitted, higher quality of service is required, maximization of data offload, vehicle's priority, higher connection security required). For these reasons, the interaction between the model builder 830 and the decision manager 840 may be configured as feedback based, that is, with a feedback loop, where the decision manager 840 is able to tell the model builder 830 which model to run, according to specific requirements that might exist, and evaluate the output.

The information dissemination manager 850 manages the type of information to be shared, the entities with which the information is shared (e.g., other vehicles, such as remaining vehicle of the fleet that includes the vehicle, and/or with the Cloud, that is, steps (3) and (5) in the use case scenario described with respect to FIG. 7), and/or the manner by which the information is shared (e.g., in real-time and/or delayed manner). For example, the type of information that may be shared with other vehicles may include same type of information gathered or obtained from other vehicles (as described above, with respect to the information gathered by the information gatherer 810). Examples of information that may be shared with the Cloud may include information relating to network providers, APs perceived performance/ratings, ability to meet the connection requirements (e.g., quality of service, data costs), models and their system footprint. The information shared with the Cloud may be periodic (e.g., once a month), in order to achieve the goal of lowering data communication costs. However, if there are emergency messages that the fleet/great amount of vehicles should be aware of, the vehicle can decide on sending real-time data to the Cloud.

In various example use case scenarios, the above described in-vehicle data-driven connectivity optimization related elements, functions, and/or actions/steps, or at least some of them, may be adaptively utilized, particularly according to certain requirements specific for each of the use case scenarios. For example, the decisions that the vehicle has to take during its lifetime in order to optimize wireless performance connectivity, along with the aforementioned steps of the decision process described with respect to the in-vehicle system 800, may vary based on the use case scenario. Thus, based on the particular objective function for each use case scenario, different real time data sources may be used, different models may be generated (or configured) based on the collected data, and/or different decisions may be taken.

In an example use case scenario where the objective function may be maximizing data offload in a crossing road, the real-time data sources may comprise current vehicle's position and APs scan. The models may comprise route prediction (e.g., probability of taking a road) based on current vehicle's position and its routes history. The models may also comprise AP ranking by road based on historical offload capacity and probability of successful connection. The decisions taken may comprise connecting to the first AP on the ranking list, in the predicted road.

In an example use case scenario where the objective function may be seamless connectivity with low data consumption, the real-time data sources may comprise current vehicle's position and APs scan. The models may comprise ranking of APs by connection time, such as based on: their historic of connection time with Internet access, probability of a successful connection and users' data needs profile. The models may also comprise listing of best disconnection distances (e.g., distances at which disconnecting to an AP still guarantees a good quality of service). The decisions taken may comprise always connecting to the first AP of the list in the current region and disconnect at the distance given by the model. The decisions taken may also comprise choosing among the several models, a low latency model, in order to perform fast decisions to achieve seamless connectivity.

In an example use case scenario where the objective function may be minimizing connectivity data cost, the real-time data sources may comprise list of network providers by data cost sent by the Cloud. The models may comprise ranking of APs of the network provider that allows for a lower data price (e.g., by success rate and traffic per second, based on their historic data). The decision(s) taken may comprise connecting to first AP on the ranking list.

In an example use case scenario where the objective function may be good quality of service while stopped in a queue, the real-time data sources may comprise V2V sharing about one or more of visible APs and their profile, vehicle's priority, and data needs. The models may comprise APs ranking regarding offload capacity (as being stopped makes the success rate less important, since several connection attempts can be made). The models may also comprise relation between antenna transmission power and distance to the AP that maximizes the offload. The decision(s) taken may comprise connecting to the best available AP according to vehicle's priority and data needs. The decision(s) taken may also comprise adjusting antenna transmission power according to the distance to the AP.

An example system for supporting in-vehicle data-driven connectivity optimization in a network of moving things, in accordance with the present disclosure, comprises an on-board unit configured for deployment in a vehicle, where the on-board unit has at least one communication circuit and at least one processing circuit. The at least one communication circuit is configured to communicate signals for transmission and reception of data, and the at least one processing circuit is configured to obtain during operations in an area of the network of moving things, connectivity-related data relating to coverage within the area, process the connectivity-related data, and to generate or update, based on processing of the connectivity-related data, a networking decision model, where the networking decision model is configured for optimizing connectivity to the one or more access points in or associated with the network of moving things.

In an example implementation, the at least one processing circuit is configured to share the networking decision model, or information relating to the networking decision model, with a Cloud-based network node in the network of moving things.

In an example implementation, the at least one processing circuit is configured to share the networking decision model, or information relating to the networking decision model, with at least one other on-board unit deployed in at least one other vehicle.

In an example implementation, the at least one communication circuit is configured to communicate the networking decision model, or the information relating to the networking decision model, to the at least one other on-board unit deployed via vehicle-to-vehicle (V2V) communication.

In an example implementation, the at least one processing circuit is configured to generate or update the networking decision model based on at least one other networking decision model, or information relating to the at least one other networking decision model received from at least one other on-board unit deployed in at least one other vehicle.

In an example implementation, the at least one processing circuit is configured to generate or update the networking decision model based on historical data associated with at least one source of the connectivity-related data.

In an example implementation, the at least one processing circuit is configured to generate or update the networking decision model based on one or more preset optimization objective.

An example system for supporting in-vehicle data-driven connectivity optimization in a network of moving things, in accordance with the present disclosure, comprises a Cloud-based network node that comprises at least one communication circuit and at least one processing circuit. The at least one communication circuit is configured to communicate signals for transmission and reception of data, and the at least one processing circuit is configured to receive from a vehicle-based network node, a networking decision model or information relating to generation of the networking decision model, and to manage connectivity in the network of moving things based on the networking decision model. The managing comprises one or both of processing the networking decision model or the information relating to generation of the networking decision model, and providing to one or more network nodes, based on the processing, modeling-related data for controlling generating, updating, or using of networking decision models.

In an example implementation, the at least one processing circuit is configured to obtain connectivity-related data, and generate or updated the modeling-related data based on the connectivity-related data.

In an example implementation, the at least one processing circuit is configured to generate, based on the connectivity-related data, information relating to updating the networking decision model.

In an example implementation, the at least one processing circuit is configured to share the networking decision model or information relating to the networking decision model with one or more other vehicle-based network nodes.

An example method for supporting in-vehicle data-driven connectivity optimization in a network of moving things, in accordance with the present disclosure, comprises obtaining, by on-board unit deployed in a vehicle, during operations in an area of the network of moving things, connectivity-related data relating to coverage within the area, processing, by the on-board unit, the connectivity-related data, and generating or updating, by the on-board unit, based on processing of the connectivity-related data, a networking decision model, where the networking decision model is configured for optimizing connectivity to the one or more access points in or associated with the network of moving things.

In an example implementation, the method further comprises sharing the networking decision model, or information relating to the networking decision model, with a Cloud-based network node in the network of moving things.

In an example implementation, the method further comprises managing by the Cloud-based network node connectivity in the network of moving things based on the networking decision model. The managing comprises one or both of processing the networking decision model or the information relating to generation of the networking decision model, and providing to one or more network nodes, based on the processing, modeling-related data for controlling generating, updating, or using of networking decision models.

In an example implementation, the method further comprises generating or updating by the Cloud-based network node the modeling-related data based on data obtained by the Cloud-based network node.

In an example implementation, the method further comprises sharing by the Cloud-based network node the networking decision model or information relating to the networking decision model with one or more other vehicle-based network nodes.

In an example implementation, the method further comprises sharing the networking decision model, or information relating to the networking decision model, with at least one other on-board unit deployed in at least one other vehicle.

In an example implementation, the method further comprises communicating the networking decision model, or the information relating to the networking decision model, to the at least one other on-board unit deployed via vehicle-to-vehicle (V2V) communication.

In an example implementation, the method further comprises generating or updating the networking decision model based on at least one other networking decision model, or information relating to the at least one other networking decision model received from at least one other on-board unit deployed in at least one other vehicle.

In an example implementation, the method further comprises generating or updating the networking decision model based on historical data associated with at least one source of the connectivity-related data.

In an example implementation, the method further comprises generating or updating the networking decision model based on one or more preset optimization objectives.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

In accordance with various aspects of this disclosure, examples of the networks and/or components thereof presented herein are provided in U.S. Provisional Patent Application Ser. No. 62/222,192, entitled "Communication Network of Moving Things," filed Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Patent Application Ser. No. 62/221,997, entitled "Integrated Communication Network for A Network of Moving Things," filed Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Patent Application Ser. No. 62/222,016, entitled "Systems and Methods for Synchronizing a Network of Moving Things," filed Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Patent Application Ser. No. 62/222,042, entitled "Systems and Methods for Managing a Network of Moving Things," filed Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Patent Application Ser. No. 62/222,066, entitled "Systems and Methods for Monitoring a Network of Moving Things," filed Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Patent Application Ser. No. 62/222,077, entitled "Systems and Methods for Detecting and Classifying Anomalies in a Network of Moving Things," filed Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Patent Application Ser. No. 62/222,098, entitled "Systems and Methods for Managing Mobility in a Network of Moving Things," filed Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Patent Application Ser. No. 62/222,121, entitled "Systems and Methods for Managing Connectivity a Network of Moving Things," filed Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Patent Application Ser. No. 62/222,135, entitled "Systems and Methods for Collecting Sensor Data in a Network of Moving Things," filed Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Patent Application Ser. No. 62/222,145, entitled "Systems and Methods for Interfacing with a Network of Moving Things," filed Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Patent Application Ser. No. 62/222,150, entitled "Systems and Methods for Interfacing with a User of a Network of Moving Things," filed Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Patent Application Ser. No. 62/222,168, entitled "Systems and Methods for Data Storage and Processing for a Network of Moving Things," filed Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Patent Application Ser. No. 62/222,183, entitled "Systems and Methods for Vehicle Traffic Management in a Network of Moving Things," filed Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Patent Application Ser. No. 62/222,186, entitled "Systems and Methods for Environmental Management in a Network of Moving Things," filed Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Patent Application Ser. No. 62/222,190, entitled "Systems and Methods for Port Management in a Network of Moving Things," filed Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Patent Application Ser. No. 62/244,828, entitled "Utilizing Historical Data to Correct GPS Data in a Network of Moving Things," filed Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Patent Application Ser. No. 62/244,930, entitled "Using Anchors to Correct GPS Data in a Network of Moving Things," filed Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Patent Application Ser. No. 62/246,368, entitled "Systems and Methods for Inter-Application Communication in a Network of Moving Things," filed Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Patent Application Ser. No. 62/246,372, entitled "Systems and Methods for Probing and Validating Communication in a Network of Moving Things," filed Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Patent Application Ser. No. 62/250,544, entitled "Adaptive Rate Control for Vehicular Networks," filed Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Patent Application Ser. No. 62/273,878, entitled "Systems and Methods for Reconfiguring and Adapting Hardware in a Network of Moving Things," filed Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Patent Application Ser. No. 62/253,249, entitled "Systems and Methods for Optimizing Data Gathering in a Network of Moving Things," filed Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Patent Application Ser. No. 62/257,421, entitled "Systems and Methods for Delay Tolerant Networking in a Network of Moving Things," filed Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Patent Application Ser. No. 62/265,267, entitled "Systems and Methods for Improving Coverage and Throughput of Mobile Access Points in a Network of Moving Things," filed Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Patent Application Ser. No. 62/270,858, entitled "Channel Coordination in a Network of Moving Things," filed Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Patent Application Ser. No. 62/257,854, entitled "Systems and Methods for Network Coded Mesh Networking in a Network of Moving Things," filed Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Patent Application Ser. No. 62/260,749, entitled "Systems and Methods for Improving Fixed Access Point Coverage in a Network of Moving Things," filed Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Patent Application Ser. No. 62/273,715, entitled "Systems and Methods for Managing Mobility Controllers and Their Network Interactions in a Network of Moving Things," filed Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Patent Application Ser. No. 62/281,432, entitled "Systems and Methods for Managing and Triggering Handovers of Mobile Access Points in a Network of Moving Things," filed Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Patent Application Ser. No. 62/268,188, entitled "Captive Portal-related Control and Management in a Network of Moving Things," filed Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Patent Application Ser. No. 62/270,678, entitled "Systems and Methods to Extrapolate High-Value Data from a Network of Moving Things," filed Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Patent Application Ser. No. 62/272,750, entitled "Systems and Methods for Remote Software Update and Distribution in a Network of Moving Things," filed Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Patent Application Ser. No. 62/278,662, entitled "Systems and Methods for Remote Configuration Update and Distribution in a Network of Moving Things," filed Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Patent Application Ser. No. 62/286,243, entitled "Systems and Methods for Adapting a Network of Moving Things Based on User Feedback," filed Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Patent Application Ser. No. 62/278,764, entitled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Patent Application Ser. No. 62/286,515, entitled "Systems and Methods for Self-Initialization and Automated Bootstrapping of Mobile Access Points in a Network of Moving Things," filed Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Patent Application Ser. No. 62/295,602, entitled "Systems and Methods for Power Management in a Network of Moving Things," filed Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Patent Application Ser. No. 62/299,269, entitled "Systems and Methods for Automating and Easing the Installation and Setup of the Infrastructure Supporting a Network of Moving Things," filed Feb. 24, 2016, which is hereby incorporated herein by reference in its entirety.

Further, in accordance with various aspects of this disclosure, the networks and/or components thereof presented herein are provided with systems and methods for dynamic management and control of multiple Wi-Fi radios, non-limiting examples of which are provided in U.S. patent application Ser. No. 16/829,262, filed Mar. 25, 2020, which is hereby incorporated herein by reference in its entirety.

Further, in accordance with various aspects of this disclosure, the networks and/or components thereof presented herein are provided with systems and methods for dynamic and automatic connection to Wi-Fi access points using multiple authentication and operation modes, non-limiting examples of which are provided in U.S. patent application Ser. No. 16/891,668, on Jun. 3, 2020, which is hereby incorporated herein by reference in its entirety.

Further, in accordance with various aspects of this disclosure, the networks and/or components thereof presented herein are provided with systems and methods for intelligent offloading of traffic to public and private Wi-Fi hotspots leveraging the Cloud, non-limiting examples of which are provided in U.S. Provisional Patent Application Ser. No. 16/905,061, filed Jun. 18, 2020, which is hereby incorporated herein by reference in its entirety.

Further, in accordance with various aspects of this disclosure, the networks and/or components thereof presented herein are provided with systems and methods for Cloud-based data-driven Wi-Fi connectivity management in a network of moving things including, for example, autonomous vehicles, non-limiting examples of which are provided in U.S. patent application Ser. No. 16/984,933, filed Aug. 4, 2020, which is hereby incorporated herein by reference in its entirety.

Further, in accordance with various aspects of this disclosure, the networks and/or components thereof presented herein are provided with systems and methods for adaptive and dynamic Wi-Fi scanning policies in a network of moving things including, for example, autonomous vehicles, non-limiting examples of which are provided in U.S. patent application Ser. No. 16/984,953, filed Aug. 4, 2020, which is hereby incorporated herein by reference in its entirety.

Further, in accordance with various aspects of this disclosure, the networks and/or components thereof presented herein are provided with systems and methods for dynamic gathering, classification, and accounting of metadata in a network of moving things, non-limiting examples of which are provided in U.S. patent application Ser. No. 17/106,535, filed Nov. 30, 2020, which is hereby incorporated herein by reference in its entirety.

Further, in accordance with various aspects of this disclosure, the networks and/or components thereof presented herein are provided with systems and methods for billing of metadata in a network of moving things, non-limiting examples of which are provided in U.S. patent application Ser. No. 17/106,430, filed Nov. 30, 2020, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system configured for supporting in-vehicle data-driven connectivity optimization in a network of moving things, the system comprising:
   an on-board unit configured for deployment in a vehicle, comprising:
   at least one communication circuit configured to communicate signals for transmission and reception of data; and
   at least one processing circuit configured to:
   obtain during operations in an area of the network of moving things connectivity-related data relating to coverage within the area;
   control the obtaining of connectivity-related data based on stability of one or more networking decision models used by the on-board unit, wherein:
   the one or more networking decision models are configured for enabling wireless connectivity decisions; and
   the controlling based on the stability of the one or more networking decision models comprises assessing differences between successive model iterations;
   process the connectivity-related data; and
   update, based on processing of the connectivity-related data, a networking decision model from the one or more networking decision models, wherein the networking decision model is configured for optimizing connectivity to one or more access points in or associated with the network of moving things.

2. The system of claim 1, wherein the at least one processing circuit is configured to share the networking decision model, or information relating to the networking decision model, with a Cloud-based network node in the network of moving things.

3. The system of claim 1, wherein the at least one processing circuit is configured to share the networking decision model, or information relating to the networking decision model, with at least one other on-board unit deployed in at least one other vehicle.

4. The system of claim 3, wherein the at least one communication circuit is configured to communicate the networking decision model, or the information relating to the networking decision model, to the at least one other on-board unit deployed via vehicle-to-vehicle (V2V) communication.

5. The system of claim 1, wherein the at least one processing circuit is configured to generate or update the networking decision model based on at least one other networking decision model, or information relating to the at least one other networking decision model received from at least one other on-board unit deployed in at least one other vehicle.

6. The system of claim 1, wherein the at least one processing circuit is configured to generate or update the networking decision model based on historical data associated with at least one source of the connectivity-related data.

7. The system of claim 1, wherein the at least one processing circuit is configured to generate or update the networking decision model based on one or more preset optimization objective.

8. A system configured for supporting in-vehicle data-driven connectivity optimization in a network of moving things, the system comprising:
a Cloud-based network node that comprises:
at least one communication circuit configured to communicate signals for transmission and reception of data; and
at least one processing circuit configured to:
provide to network nodes in the network of moving things, information relating to networking decision modeling, the information comprising, at least, one or both of information relating to system requirements and context related information relating to vehicles associated with network nodes;
receive from a vehicle-based network node, a networking decision model or information relating to generation of the networking decision model; and
manage connectivity in the network of moving things based on the networking decision model, the managing comprising:
processing the networking decision model or the information relating to generation of the networking decision model;
updating the networking decision model maintained by the Cloud-based network node based on requirements and/or needs of one or more vehicles; and
providing to one or more network nodes, based on the processing, modeling-related data for controlling generating, updating, or using of networking decision models.

9. The system of claim 8, wherein the at least one processing circuit is configured to obtain connectivity-related data; and to generate or update the modeling-related data based on the connectivity-related data.

10. The system of claim 9, wherein the at least one processing circuit is configured to generate, based on the connectivity-related data, information relating to updating the networking decision model.

11. The system of claim 8, wherein the at least one processing circuit is configured to share the networking decision model or information relating to the networking decision model with one or more other vehicle-based network nodes.

12. A method for supporting in-vehicle data-driven connectivity optimization in a network of moving things, the method comprising:
obtaining, by on-board unit deployed in a vehicle, during operations in an area of the network of moving things, connectivity-related data relating to coverage within the area;
controlling the obtaining of connectivity-related data based on stability of one or more networking decision models used by the on-board unit, wherein:
the one or more networking decision models are configured for enabling wireless connectivity decisions; and
the controlling based on the stability of the one or more networking decision models comprises assessing differences between successive model iterations;
processing, by the on-board unit, the connectivity-related data; and
updating, by the on-board unit, based on processing of the connectivity-related data, a networking decision model from the one or more networking decision models, wherein the networking decision model is configured for optimizing connectivity to one or more access points in or associated with the network of moving things.

13. The method of claim 12, further comprising sharing the networking decision model, or information relating to the networking decision model, with a Cloud-based network node in the network of moving things.

14. The method of claim 13, further comprising managing by the Cloud-based network node connectivity in the network of moving things based on the networking decision model, the managing comprising one or both of:
processing the networking decision model or the information relating to generation of the networking decision model; and
providing to one or more network nodes, based on the processing, modeling-related data for controlling generating, updating, or using of networking decision models.

15. The method of claim 14, further comprising generating or updating by the Cloud-based network node the modeling-related data based on data obtained by the Cloud-based network node.

16. The method of claim 13, further comprising sharing by the Cloud-based network node the networking decision model or information relating to the networking decision model with one or more other vehicle-based network nodes.

17. The method of claim 12, further comprising sharing the networking decision model, or information relating to the networking decision model, with at least one other on-board unit deployed in at least one other vehicle.

18. The method of claim 17, further comprising communicating the networking decision model, or the information relating to the networking decision model, to the at least one other on-board unit deployed via vehicle-to-vehicle (V2V) communication.

19. The method of claim 12, further comprising generating or updating the networking decision model based on at least one other networking decision model, or information relating to the at least one other networking decision model received from at least one other on-board unit deployed in at least one other vehicle.

20. The method of claim 12, further comprising generating or updating the networking decision model based on historical data associated with at least one source of the connectivity-related data.

21. The method of claim 12, further comprising generating or updating the networking decision model based on one or more preset optimization objectives.

* * * * *